INVENTORS
Kenneth L. Tate
Howard R. Jaquith
BY P. J. Young, Jr.

Dec. 8, 1964   K. L. TATE ETAL   3,160,007
FORCE BALANCE MEASURING INSTRUMENT
Filed May 3, 1962   4 Sheets-Sheet 3

INVENTORS
Kenneth L. Tate
Howard R. Jaquith
BY P. J. Young, Jr.

Dec. 8, 1964 K. L. TATE ETAL 3,160,007
FORCE BALANCE MEASURING INSTRUMENT
Filed May 3, 1962 4 Sheets-Sheet 4

INVENTORS
Kenneth L. Tate
Howard R. Jaquith

BY P. J. Young, Jr.

United States Patent Office 3,160,007
Patented Dec. 8, 1964

3,160,007
FORCE BALANCE MEASURING INSTRUMENT
Kenneth L. Tate and Howard R. Jaquith, Rochester, N.Y., assignors to Taylor Instrument Companies, Rochester, N.Y., a corporation of New York
Filed May 3, 1962, Ser. No. 192,164
28 Claims. (Cl. 73—205)

This invention relates to measuring instruments of the type including spring mechanism for converting a motion into a force varying in accordance with an arbitrary, monotonic function of said motion. Such an instrument is particularly useful in cases of measurement where the variable measured is inferred from what may be loosely termed direct measurements of another variable which is supposed to vary non-linearly with respect to the first said variable.

A typical and important example, to which our invention particularly relates, is a flowmeter of the differential pressure type. Given a pipe or conduit through which fluid flows, it is often the practice to provide a restriction in the pipe which impedes the flow. As a result, a pressure drop occurs across the restriction, and a measurement of this pressure drop amounts to a measurement of the flow through the pipe. However, the pressure is to flow as the square root is to the first power and, as is well known, there arises the long-standing problem of extracting the square root, so to speak, of the pressure measurement, in order to convert the latter into a flow measurement relative to a linear scale of values.

One approach to this problem is to balance the force due to pressure against a non-linear spring unit, with the result that the elastic distortion of the spring or springs in the unit is a linearly-scaleable measure of the flow creating the pressure. Since the force due to pressure is measured by the motion of a diaphragm, or the like, out of some null position corresponding to zero flow (pressure the same on both sides of the aforesaid restriction), relatively large amounts of motion are desirable. It is generally not practical, however, to derive this motion from the diaphragm itself, hence, some motion multiplying means is required, particularly since the input of the instrument is to the output as the square is to its root.

According to our invention, we provide a differential pressure unit having a relatively small output motion, a servo-unit providing a relatively large output motion in response to a relatively small motion input and a spring-unit capable of converting a motion into a force varying in accordance with any arbitrary, monotonic function of the last said motion. The spring unit is arranged to convert the servo output motion into force on the differential pressure unit in such sense as to nullify pressure-created motions of said differential pressure unit.

In this way, the servo output motion becomes a non-linear (variable slope as opposed to constant slope) function of the differential pressure sensed by the differential pressure unit, hence, the said servo output motion and/or any other quantity or variable linearly-related to the said servo output-motion, can be made a linear function of differential pressure by causing the spring unit to behave as a square-root extracting mechanism. Furthermore, the force-balance arrangement prevents the force due to pressure from creating any but the most minute net motion. Therefore, to the extent that the spring unit functions as desired, the motion output of the servo-unit is a reliable quantitative representation of the flow creating the differential pressure.

In general, the deformation of springs at least approximately obeys Hooke's law, in normal use within elastic limits. It is therefore necessary to provide some special form of spring, or to use an ordinary spring in such a way that the stress-strain characteristic of the spring has the desired non-linearity within the elastic limits of the spring.

According to our invention, we provide a spring unit having a plurality of springs so arranged that the said springs are successively and cumulatively deformed by an input motion so that the springs, as a whole, collectively exhibit a restoring force and, as well, a spring constant, that increase in proportion to deformation. Such an arrangement is inherently non-linear, and the non-linearity thereof may be varied arbitrarily to suit practically any monotonic motion-force relation conceivable. The actual effect is one of approximating a smoothly-curved graph by a series of straight-line segments arranged end to end so that each pair of next adjacent ends thereof coincide with a point on the graph.

Figure 1:
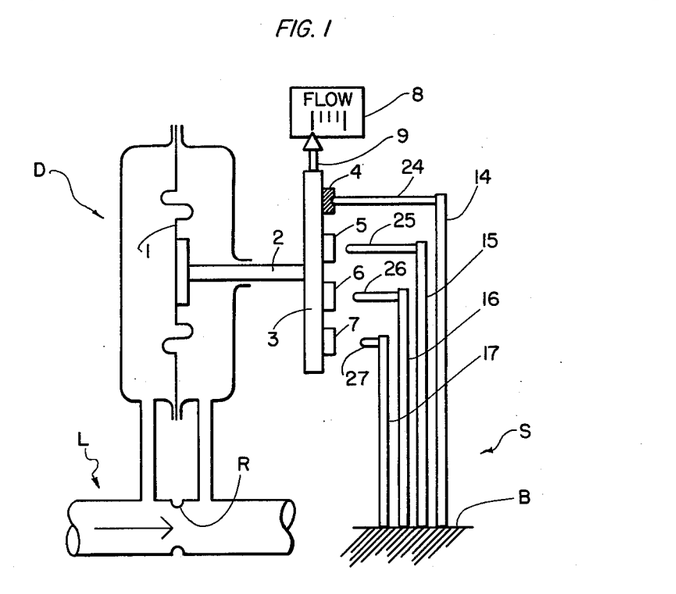
FIGURE 1 is a simple schematic illustrating the principles of our novel spring unit, as applied to measurement of fluid flow.

In FIGURE 1, a pipe L having fluid flow therethrough in the direction of the arrow has a restricted portion R. A differential pressure unit D is provided having a diaphragm 1 therein which is differentially exposed, as shown, to the respective pressures upstream and downstream of restriction R. The difference in the said pressures deflects diaphragm 1 and a stem 2 is provided for the purpose of taking the diaphragm deflection out of the casing. Stem 2 is connected at one end to the central movable part of the diaphragm and its other end mounts a cross bar 3 externally of the unit D. Stem 2 may be supposed to move linearly from left to right, while supporting cross bar 3 in a vertical position. Cross bar 3 is provided with a series of identical pads 4, 5, 6 and 7. A spring unit S is also provided having blades 14, 15, 16 and 17 fixed at their lower ends to a fixed support B, relative to which stem 2 moves. The said blades are provided with studs 24, 25, 26 and 27, one per blade as shown.

For simplicity, it will be supposed that at zero-flow in pipe L some nominal force on diaphragm 1 holds pad 4 just in contact with the left end of stud 24. As the sectional showing of pad 4 indicates, pad 4 has a rounded recess receiving the rounded left end of stud 24. Each of pads 5, 6 and 7 would also be provided with a rounded recess like pad 4, and, as shown, the left end of each of studs 25, 26 and 27 is rounded like the left end of stud 24.

It is also to be supposed that blades 14, 15, 16 and 17 are vertical and in substantially unstressed condition. Therefore, if flow occurs in the direction of the arrow in pipe L, diaphragm 1 will move to the right and strain blade 14, cantilever fashion. If the flow rate becomes large enough, the left end of stud 25 will be picked up by pad 5 and spring 15 will deflect. Further flow increase will cause pad 6 to pick up stud 26. Eventually, each of springs 14, 15, 16 and 17 will be resisting the force due to the pressure drop across restriction R. It can be readily seen that if the drop across restriction R increases, by equal increments, and if the force on the diaphragm due to the pressure increases linearly as a result, successive increments of motion stem 2 decrease each time a new stud is picked up by a pad. In between pick-ups, however, equal increments of pressure-created force give rise to equal increments of stem motion. Intuitively, it is evident that the differential pressure vs. stem motion characteristic will fall on some curve including four points given by the displacement at the point of pick-up of blades 14–17, from zero flow position, of stem 2. If the number of blades 14 were increased indefinitely in a finite increment of displacement of stem 2, all the points of some continuous curve would be defined by the points of pick-up.

For example, suppose each of blades 15, 16 and 17 to be twice as stiff as blade 14, and that the points of pick-up of studs 26 and 27 are respectively twice and thrice as far from the zero flow position of their respective pads as is stud 25 from pad 5. It can then be shown that for each successive quarter of the total range of rightward displacement of stem 2, that the net displacement of stem 2 is as the square root of the force due to pressure on diaphragm 1, assuming that unit D converts pressure into stem motion without introducing any non-linearities due to the characteristics of unit D, and assuming that the blades 14–17 are sufficiently long that the slightly arcuate path of the blade ends can be neglected. Supposing that the graduations of a scale 8 are equally spaced along the horizontal line of travel of a pointer 9 on cross bar 3, and that the net stiffness of springs 14–17 is such that at maximum flow, the right-most graduation of scale 8 is reached by pointer 9, then the graduations of scale 20 correspond to the points $x=0, 1, 4, 9, 16$ of the parabola $y=\sqrt{x}$. Interpreting $y$ as flow and $x$ as differential pressure, then the instrument of FIGURE 1 is a linearly-indicating flowmeter.

The instrument of FIGURE 1 is a prefectly workable arrangement. Unfortunately, it requires the diaphragm to supply relatively large amounts of motion, particularly since the spring unit requires it. If the available diaphragm motion were small, it would be quite difficult to set the pick-up points of studs 24–27 precisely and definitely. It is usually preferable, for sturdiness, linearity and reliability to make the diaphragm 1, or other pressure responsive member, relatively stiff, and to use force-balance techniques for their well-known benefit, which includes linearity improvement, and amplification of the output available from the primary element.

Figures 2, 12:
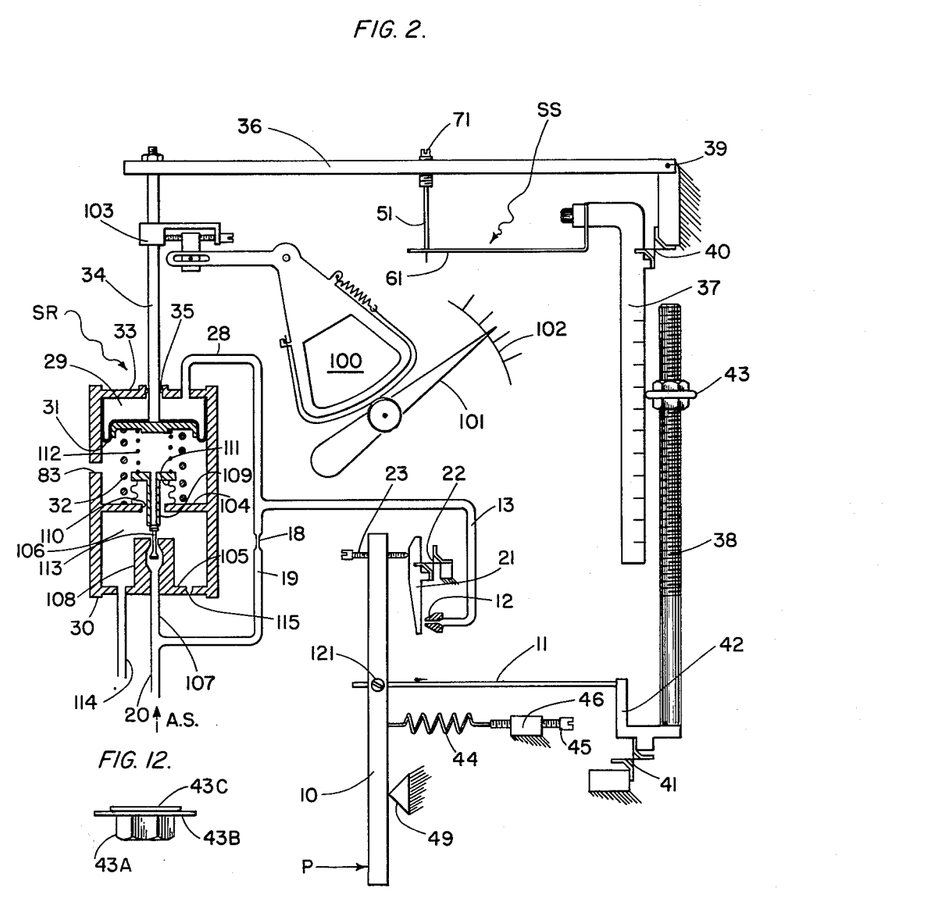
FIGURE 2 is a schematic showing of a so-called flow transmitter, utilizing our novel spring unit.
FIGURES 4 to 13, inclusive, are fragmentary detailed views of the several elements and subcombinations thereof of the instrument, shown in FIGURE 3.
Figure 3:
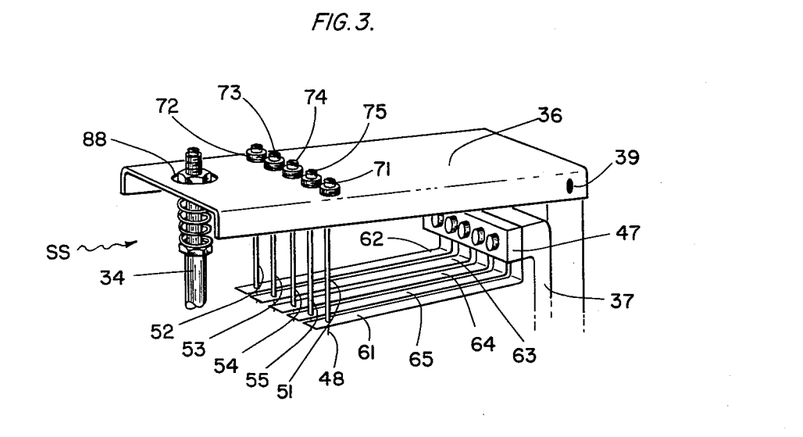
FIGURE 3 is a perspective view of that part of the instrument of FIGURE 2 including our novel spring unit.

FIGURE 2 illustrates a so-called flow transmitter of the force-balance type, in which a servo unit and motion detecting means are combined with what amounts to the elements of FIGURE 3.

In FIGURE 2, reference numeral 10 denotes a primary force beam acted upon by a force P, due to differential pressure derived from fluid flow through a restriction in a pipe or conduit (not shown). Force P is applied so that its moment on beam 10 is exerted in a counter-clockwise sense about a fixed fulcrum 49. A connecting rod 11 is secured to the beam above fulcrum 49, in order to provide, as will be seen later, for exerting a force on the beam in opposition to the force P.

Deflections of beam 10 are detected by a nozzle 12 terminating pipe 13, pipe 13 being connected via a flow restriction 18 to pipe 19, and pipe 19 being connected to a pipe 20, which in turn is connected with a regulated air supply A.S., which provides clean, dry, instrument air at substantially constant super atmospheric pressure.

Deflections of beam 10 are sensed by nozzle 12 as deflections of the lower end of a baffle 21. Baffle 21 is pivotally supported by a fixed crossed spring strip fulcrum 22. A screw 23, tapped through the upper end of beam 10, bears on the upper end of baffle 21. Suitable bias means (not shown) are provided to urge the baffle 21 counter-clockwise about pivot 22 so as to maintain engagement of screw 23 and the baffle 21 at all times during normal operation. It will be evident that a very slight deflection of beam 10 is all that is necessary to deflect baffle 21 between a position where it offers a maximum impediment to flow of air out of the nozzle 12, and a position where it offers no impediment to nozzle flow. Deflection of beam 10 therefore creates back pressure changes in pipe 13.

Such back pressure changes are propagated via a pipe 28 to a pressure chamber 29 of a servo unit SR. The inner dimensions of nozzle 12 and pipes 13 and 28 are of such size as to permit free flow of air, as compared to restriction 18.

Thus, it will be seen that beam 10, and the entity exerting the force on beam 10, (a differential pressure device such as shown at D in FIGURE 1, for example), amount to a motor whose motive effect occurs as deflections of beam 10, in response to variation in some condition such as flow across the restriction R, FIGURE 1. The effect of a spring such as shown at 44 in FIGURE 1, makes such motive effect correspond to the magnitude of said condition. In relation to baffle 21 and nozzle 12, etc., moreover, beam 10 acts also as a control element for baffle-nozzle spacing and hence of the back pressure in pipe 13.

Servo unit SR is preferably a servo-relay such as is disclosed in copending application SN 141,127, of K. L. Tate et al., filed September 27, 1961, and assigned to the assignee of the present application.

Briefly described, the servo unit consists of a servo section and a relay section incorporated in a cylindrical casing 30 (shown in longitudinal section in FIGURE 2). The servo section includes a long-stroke diaphragm 31, biased upward by spring 32 toward a partition 33 closing the upper end of casing 30. A servo rod 34 is connected to the diaphragm 31, passing through an aperture in the partition 33, surrounded by a gasket, such as O-ring 35 around the aperture, in order to permit the rod 34 to move up and down in the aperture with minimum friction and leakage between rod and sealing means.

The magnitude of the air supply pressure, of spring constant of spring 32, and of the friction force on rod 34 are so chosen that a superatmospheric pressure considerably less than that of the pressure of the air supply A.S. will drive the diaphragm 31 downward against the forces of spring, friction and atmospheric pressure acting through a vent 83 on the underside of diaphragm 31. It will be evident that slight deflections of beam 10 will serve to exhaust chamber 29 to nearly atmospheric pressure, or to pressurize it to nearly the value of the pressure provided by supply A.S.

Diaphragm 31 is of a slack reentrant type, permitting relatively large deflections thereof, i.e., "long-strokes" of rod 34. As a result, relatively slight deflections of beam 10 suffice to create relatively large vertical excursions of rod 34. Furthermore, it can easily be arranged that a pressure change of less than half the value of the pressure of the air supply, suffices to move the rod 34 all the way against the resisting forces inherent in the relay unit SR. Therefore, a large amount of energy is available for the purpose of causing the rod to execute large motions in the face of resistance otherwise imposed on it.

It will be seen from the foregoing that diaphragm 31, rod 34 and the upper part of the servo-relay casing 30 amount to a motor means, whose motive effect is produced by a pressure difference across said diaphragm. Spring 32 makes such motive effect correspond to said pressure difference, and baffle 21 and nozzle 12, etc., amount to a control element for controlling the magnitude of said pressure difference and hence of said motive effect: stroke of rod 34.

The capacity of the servo unit for large-motion at high-energy is ideal for the purpose of making a motion to force conversion via a non-linear spring unit of the type disclosed herein. However, since it is ultimately desired to return the motion output of the servo to the beam 10, in the form of a rebalance force exerted through connecting rod 11, a motion beam 36, a secondary force beam 37, and a tertiary force beam 38 are also provided.

Motion beam 36 corresponds to cross-bar 3 of FIGURE 1, but is pivotally supported at its right end on a pivot 39 fixed in space, and at its left end it is connected to the upper end of servo-rod 34. Secondary force beam 37 is pivotally supported by a fixed spring strip fulcrum 40 adjacent pivot 39. Tertiary force beam 38 is pivotally supported at its lower end by a fixed spring strip fulcrum 41, and has an arm 42 to which the right end of connecting rod 11 is secured.

Beams 37 and 38 are interconnected by means of a fulcrum nut 43 on the threaded portion of beam 38. As shown, if beam 37 be deflected counter-clockwise, it will apply a force to beam 38 via the nut 43, and the leverage of beam 37 on beam 38 may be adjusted by screwing nut 43 along the threaded upper end of beam 38.

In order to convert the motion of beam 36 (i.e., its deflection about pivot 39) into force, the spring unit SS is provided. Spring unit SS consists of a plurality of cantilever-mounted flat spring blades 61–65 secured at one end of beam 37, there being a plurality of pins 51–55 rigidly interconnecting motion beam 36 and certain of the remaining ends of the spring blades. In the view of FIGURE 2, only one pin, 51, and one spring blade, 61, are shown, the remaining pins and blades being imagined to lie directly behind pin 51 and blade 61, respectively.

From the description thus far of FIGURE 2, it will be evident that if primary force beam 10 be deflected slightly counter-clockwise (as by increase of the force P as a result of a flow increase) the bias on baffle 21 will deflect it counter-clockwise as the screw 23 retreats from the upper end of baffle 21. As a result, the flow of supply air out of nozzle 12 decreases and pressure builds up in chamber 29, so that diaphragm 31 is forced downward. Motion beam 36 is therefore caused to deflect counter-clockwise by rod 34, which deflection is transferred via the said pin 51 to the blade 61 of the spring unit SS. As a result, a counter-clockwise force is exerted on beam 37 somewhere in the vicinity of where the springs of the unit SS are fixed to beam 37. This last force is transferred to beam 38 via nut 43, beam 38 experiencing a clockwise moment which is transferred to primary force beam 10 via arm 42 and connecting rod 12. Force beam 10 therefore experiences a clockwise moment that opposes the counterclockwise moment due to force P.

As long as nozzle 12 is throttled, the pressure in chamber 29 will increase (to a limit set by the air supply and by how much baffle 21 is able to impede flow out of nozzle 12).

For all values of force P below a certain maximum, a clockwise moment will therefore develop on force beam 10 that substantially cancels the deflection of beam 10 in response to force P. While the said deflection is being canceled, screw 23 is deflecting baffle 21 clockwise and the latter therefore throttles nozzle 12 less and less. As a result, the pressure in chamber 29 drops, diaphragm 31 eventually moves up, and so on, with the result that the clockwise moment on force beam 10, due to conversion of servo output to force by spring unit SS, now decreases.

It is therefore evident that, for each of the said values of P, baffle 21 is restored to a throttling position with respect to nozzle 12, such that servo rod 34 stands at a position such as to create a force-reaction in spring unit SS that just balances each said value of P, and that primary force beam 10 is always restored to very nearly the same position, which will be that corresponding to zero flow, or some minimum flow corresponding to an initial bias on force beam 10 independently of the flow-created force P. (In the present instance, a zero spring 44, connected between force beam 10, and a screw 45 are used to set the zero of the instrument of FIGURE 2, screw 45 being threadably received in a fixed member 46, permitting screw 45 to be shifted horizontally, thereby to vary the tension in spring 44. One of the connections of spring 44, to beam 10 and to screw 45, should be rotatable so that the spring does not twist when screw 45 is turned.)

However, while beam deflections are angular and servo output motion is linear, the beam lengths are relatively large in relation to beam motions. Hence, the spring unit SS, practically alone, determines the relation of force P to the position of rod 34. Moreover, the effect of angularity may be calibrated out by suitable adjustment of the spring unit SS which will now be described.

The operation of the instrument of FIGURE 3 is about the inverse of that of FIGURE 1. That is, it is as if the support B, FIGURE 1, were moved, left or right, to balance the force P, thus causing the index 9 to remain at the left-most graduation of scale 8, and as if the position support were taken as the measure of flow, the device D, as a whole, remaining in fixed position (as is assumed insofar as actual operation of the instrument of FIGURE 1 is concerned). The basic difference is in the action of servo unit SR, which, as it were, amplifies the displacement of crossbar 3 relative to support B, thus enabling the use of a spring unit SS whose range of operation in terms of motion versus spring stress is many times greater than it would be were the spring unit designed to be operated directly by primary force beam 10, or were the hypothetical force-balance operation of the instrument of FIGURE 1, as described supra, to be indulged in. Servo relay SR therefore acts as a servomotor in that the displacements of rod 34 represent much smaller displacements of the end of beam 10, and are translated by spring unit SS into forces virtually annulling the said displacements of the end of beam 10.

Turning to FIGURE 3, spring unit SS, motion beam 36, and the upper end of secondary force beam 37 are shown in perspective. For rigidity, beam 36 is in the form of a channelled member. Across the web of beam 36, pins 51–55 are arranged, operatively secured at their upper ends to screws 71–75, each of which is tapped into corresponding holes on the web of beam 36. The lower end of each pin terminates in a reduced portion like that shown at 48 on pin 51, each free end of springs 61–65 having a hole therethrough (not shown in FIGURE 3 but like those shown at 49 and 50 in FIGURES 4 and 5), slidably receiving the said reduced portion, but not so large as to pass the large portion of the pin. Supposing that each pin, screw and reduced pin portion are identical, then by elevating the screws 71–75 to different heights, it is possible to cause the number of springs effective to resist deflection of beam 36 to vary in accordance with the extent of the deflection. This is obvious by analogy to the species of FIGURE 1 and the discussion thereof, supra.

Suppose, then, that the blades 62–65 were identical as to effective length and spring constant, and that spring 61 had the same effective length as its fellows, but half the said spring constant, then the total deflection of beam 36 could be divided into five equal parts and the screws 71–75 could be adjusted so as to form an arrangement such that each pin would have its end at a height as much above the end of one of its next adjacent fellows as it is below the end of the other of its next adjacent fellows. However, the resultant servo-output motion-rebalance force relation would deviate from the ideal, due to horizontal components of the motions involved, hence, the root extraction would be somewhat in error. This source of error could be removed by slightly adjusting certain of the screws 71–75 out of the theoretical height arrangement, envisaged supra.

In practice, the spring constants of blades 62–65 are indeed identical, but blade 61 has about 40% of the spring constant of any of these blades, and the instrument is calibrated empirically, e.g., against known differential pressures, representative of various flow values, not necessarily equally-distributed in the flow range.

In particular, it is found expedient to choose the spring 61 so that the flow is indicated to the desired accuracy in the range in which spring 61 acts alone. In the present case, for an overall accuracy specification of 1% (one percent), a spring 61 having a spring rate 42% (forty-two percent) of that of any of the other of the springs (each of which is alike in spring rate) is suitable, in that it is also heavy enough that the flow indications show good repeatability as to instrument operation in the correponding flow range. Spring 61 thus has about 10% (ten percent) of the overall spring rate of the unit SS, and the straight line segments of the spring unit characteristic are secants of the flow curve, i.e., the straight line segments intersect off the curve. It is desirable to choose differential pressures corresponding to 0% (zero percent) and 100% (one-hundred percent) of flow as two of the calibration points, as well as several others corresponding to any convenient values between zero and one-hundred, say 10, 25 and 50 (ten, twenty-five and fifty).

Insofar as a parabolic characteristic is concerned, it is evident that in general, this will be closely approximated if the spring 61 is on the order of half the average spring rate of the other springs (which need not be exactly alike as to spring rate). However, it is also evident that extreme deviations in these matters may make the approximation to the desired curve rougher than the accuracy desired.

Furthermore, instead of orienting the junctions of straight-line segments joined end to end on a square root curve, or secant thereto, the segments, again end-to-end, could be arranged so that each segment is tangent to the desired curve. Here, the spring 61 is about 60% (sixty percent) of the spring rate of the next spring. It is both convenient and definitive, however, to consider spring 61, in each of the described cases, as having substantially half the average spring rate of the remaining springs.

Figure 4:
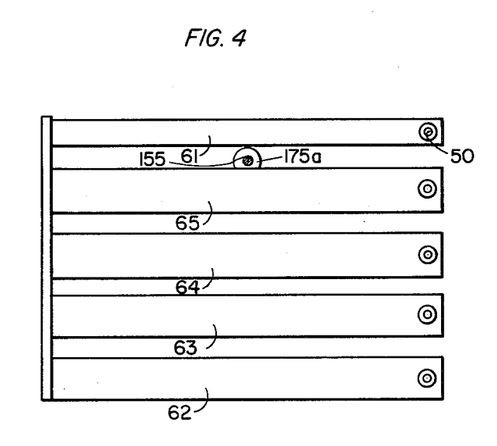
Figure 5:
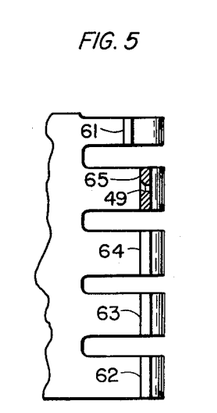

FIGURES 4 and 5 illustrate the springs of unit SS in more detail. Springs 61–65 are preferably cut out of a single uniform sheet of spring stock in the form of a comb, the teeth of which are bent at approximately right angles to the hasp of the comb. The teeth are cut far enough through the sheet that the spaces between springs extend well back under a clamping block 47 which secures the comb of springs to lever 37 and defines the free length of the springs. Clamping block and springs are so oriented and dimensioned that the natural plane of deflection of each spring is parallel to that of its fellows and to the plane of deflection of motion beam 36.

It will be observed from FIGURE 5 (see also FIGS. 5 and 6) that springs 62–65, which are coplanar, so to speak, are a little less than normal to the bent-up portion of the comb of springs, and spring 61 forms an even more acute angle with respect to said portion. This condition is in the unstressed state and the reason for it is that, in this way, angularity effects are distributed more uniformly over the range of deflection of motion beam 36. Since the springs 61 and 65 are picked up in that order, the angles they make with the bent-up portion of the comb could be set so that each spring blade ends up at an angle with respect to the bent-up portion that is as much greater than 90° at the extreme of counter-clockwise deflection of beam 36 as it was less at the zero position of beam 36, thus distributing the angularity error for each blade per se uniformly over the entire range of beam deflection. However, the configuration shown sufficiently closely approximates the necessary uniformity of distribution.

Spring blade 61 is about 40% the width of each of its fellows and, hence, has about 40% the spring constant of each of its fellows. It will be evident, therefore that as servo-rod 34 moves vertically, the force generated by unit SS will vary as the square of servo-rod motion, if the other blades are picked up or dropped at about equal intervals of servo-rod motion.

Figure 6:
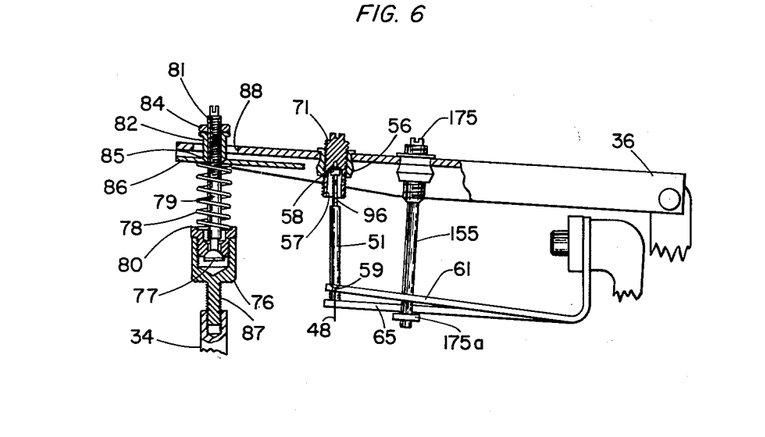

Turning to FIGURE 6, it will be noted that pin 51 and screw 71 are separate elements, screw 71 being mounted in a threaded socket 56 fixed to beam 36, and having an axial countersink 57 having a conical bottom into which fits the rounded head 58 of pin 51. Pin 51 is rounded at 59 where its reduced portion 48 begins, so that when the lower end of pin 51 homes into the conical part of its hole 50, a smooth line contact between pin 51 and blade 61 occurs. At the same time, as beam 36 deflects, the rounded head 58 pivots on the end of countersink 57 so that with the slight play allowed by hole 50, pin 51 accommodates itself to the angularity of the deflection of spring 51 and of beam 36. The remaining pins and screws would, of course, be constructed in the fashion of pin 51 and screw 71.

Pins 51 to 55, inclusive, being relatively long (FIGURES 4 to 10, inclusive, are substantially scale representations of the actual structure) little pin friction develops as the quadrilateral corresponding to said pins, beam 36, springs 61 et al. and the upper end of beam 37, and the fixed structure to which beams 37 and 36 are pivoted, changes its corner angles. Supposing each of pins 51 to 55, inclusive, to have a point with a given radius of curvature, the longer the pin the less the point must slide in the socket of the corresponding one of screws 71 to 75, inclusive, for a given deflection of beam 36.

Again, having screws 71 to 75, inclusive, mounted on beam 36, and the ends of springs 61 to 65, inclusive, fixed to beam 37, is advantageous. Not only is access for purposes of adjustment convenient, but also, the said screws are on the "hard" side of the instrument, so to speak. That is, in normal operation, servo relay SR acts to maintain the configuration of the mechanism connected thereto, as long as there is no change in spacing between baffle 21 and nozzle 12. Thus, the pressure of a screwdriver on one of screws 71 to 75, inclusive, acts through the compliance of spring unit SS, and any motion of beam 36 from this cause results in little motion of beam 37. On the other hand, since there is no compliance to absorb part of it, the same pressure on beam 37 would result in a motion being rigidly transmitted, to baffle 21, whereby such change in baffle nozzle spacing would occur as to cause the output of the servo-relay SR and the position of rod 34 to fluctuate greatly.

In other words, while the ends of springs 61 to 65, inclusive, could be fixed to beam 36 and the pins, adjusting screws, etc., mounted between beam 37 and the free ends of said springs, nevertheless, the arrangement shown in FIGURE 3 is substantially superior.

The linear motion of servo-rod 34 must be accommodated to the angular motion of beam 36, hence, a sort of ball and socket coupling including a socket 76, a spherical segment 77, a spring 78 and a stud 79 are provided. Segment 77, integrally secured to stud 79, is secured in well 76 by a perforated socket nut 80 screwed in well 76. The stud 79 passes through nut 80, which, as shown, furnishes the "socket" for the segment 77, which acts as a "ball" therein, whereby to define a ball and socket coupling.

The upper end of stud 79 is provided with a screw portion 81 tapped into a collar 82. The lower end of collar 82 is rounded and is received in the conical upper side of a hole 85 in a bimetallic plate 86. Between the lower side of the plate 86 and the upper end of nut 80, spring 78 is arranged in compression around stud 79.

The force of spring 78 hence removes any lost motion between bimetallic plate 86 and socket 76. Socket 76 is provided with a threaded portion 87 which screws into the end of rod 34, and plate 86 is secured, cantilever fashion, by suitable means to be described later, to beam 36.

It will be observed that socket 76, etc., prevent the rod 34 from being cocked by deflection of beam 36, and permit adjustment to be made of the beam 36 by turning screw 81 (normally fixed in position by a locknut 84) in collar 82 to shorten or lengthen the effective length of stud 79.

Figure 10:
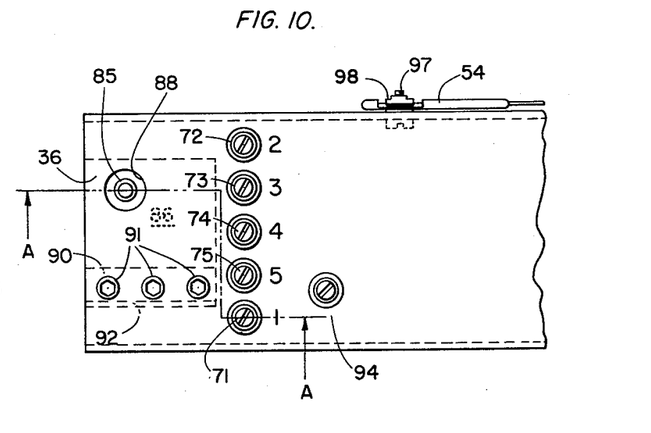
Figure 11:
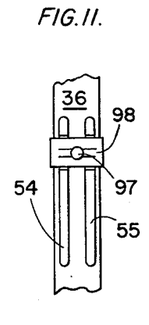

As will be noted from FIGURES 6 and 10, a hole 88 in beam 36 permits collar 82 to project above the beam, said hole being of sufficient dimensions that the beam 36 does not contact collar 82 and nut 84 as these parts move.

This arrangement permits easy access to collar 82 and simplifies the problem of connecting the rod 34 to plate 86. If the collar 82, etc., were located beneath beam 36, a relatively massive clamping means would be needed to clamp plate 86 to beam 36, and/or, instead of a simple plate 86, a bimetallic element of relatively complex shape would be required.

The purpose of the bimetallic plate 86 is to provide temperature compensation, and we have devised a means of securing plate 86 to beam 36 that provides for adjusting the compensation effect, without introducing any complex mechanism to provide for adjustment.

Figure 7:
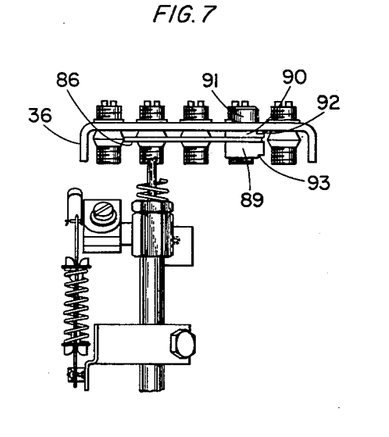
Figure 8:
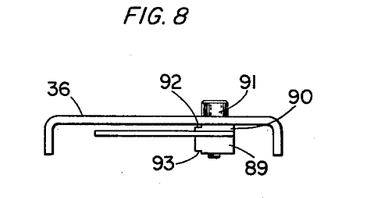
Figure 9:
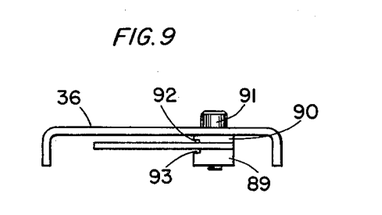

Since plate 86 is mounted cantilever style, it is necessary to provide some sort of clamping arrangement to accurately define the effective length of the said plate. Clamping blocks suitable for this purpose are shown in FIGURES 7–10 inclusive. As shown in FIGURES 7, 8 and 9, clamp blocks 89 and 90 are provided. As is evident from FIGURE 10, block 90 is a right parallelepiped, except that it is stepped at 92, as by machining out a right parallelepipedal segment, the faces of which were rectangular segments of the faces of the block 90. Blocks 89 and 90 may be identical, but as shown, they are unlike in their shortest dimensions, i.e., those measured along the vertical in FIGURES 7, 8 and 9. Block 89 has a step on it, at 93, corresponding to that, at 92, on block 90. When clamped, the web of beam 36 is, in effect, a part of block 90.

Suitable holes (not shown) are provided in blocks 89 and 90, one end of plate 86 and across beam 36, to provide for securing these elements together by means of screws 91, the holes in block 89 suitably being threaded to allow blocks and plate to be drawn up tightly, against beam 36, as indicated in FIGURES 7, 8 and 9.

The holes in blocks 89 and 90, for screws 91 are located so that the center lines of the screws 91, when in place, define a plane that is normal to FIGURES 7, 8 and 9, and lies between the normal, vertical plane which bisects the narrower, horizontal faces of the blocks, and the corresponding plane that perpendicularly bisects the wider horizontal faces of the blocks. This being the case, it will be evident that the free length of plate 86 is different in each of FIGURES 7, 8 and 9 due to the differing orientation of the said horizontal faces of blocks 89 and 90. It is possible to provide for additional free lengths of plate 86 by stepping others of the long corners of blocks 89 and 90.

The material of plate 86 is so chosen that change in plate temperature causes the plate to curve or deflect about an axis normal to FIGURES 7, 8 and 9 and somewhere in the vicinity of the clamped side of plate 86. The sense of deflection relative to the sense of temperature change may be like or unlike, and is reversible simply by inverting the plate.

Since beam 36 is rather broad, it is convenient to provide thereon calibration data and like relevant information. For example, a row of numbers 1, 5, 4, 3, 2 gives the order in which springs 61–65 should be picked up. Said row may be placed, as shown, along the shorter dimension of the more or less clear area, indicated generally by the reference numeral 94, extending rightwards on the top of beam 36 from the row of screws 71 to 75, inclusive, or may be thus placed on a separate data plate (not shown) substantially coincident with area 94.

Because of the width of the beam 36, order of pick-up of springs 61–65 is worthy of consideration though not critical. The serial pick-up of springs 61–65, and their mode of connection to the beam 36, tend to twist beam 36 about its length. This twisting effect is minimized by adjusting the screws 71–75 to such heights that the springs are picked in the order of their reference numerals, which corresponds to the 1, 5, 4, 3, 2 order indicated on area 94.

The nature of the spring unit SS is such that change of calibration is relatively easy. The instrument can be changed from a flow meter with square root extraction to a differential pressure measuring device without root extraction simply by removing pins 54 and 55, and readjusting the remaining pins. The unused pins can be clipped right to beam 36 by means of a sheet metal nut 98 screwed to a screw stud 97 projecting from the side of beam 36. Nut 98 may straddle reduced portions of pins 54 and 55 like that shown at 96 on their fellow, pin 51, FIGURE 6.

The remaining pins would be adjusted to just bear on their associated springs at zero differential pressure. Supposing that the instrument converted had not been changed in any other way, the range of differential pressure as such covered by the instrument, would be substantially the same as before, i.e., at full range differential pressure the total force in springs 61, 63 and 62, would be about the same as it would have been had all five springs been acting to extract the root of said full-range differential pressure.

An instrument of this type has the inherent peculiarity that it is extremely sensitive at the lower end of its range of output. For example, its first 10% of output may cover a net differential pressure change equivalent to a 2 inch head of water. Hence, the instrument output at zero differential pressure may be other than the desired zero value, due to vibrations, friction, hysteresis, and other influences that are normally swamped out, or are substantially nullified by the force balance principle. While it is often true that the user is not concerned with flow in the lower range of the instrument, it is also the case that the user tends to judge an instrument by its behavior when its input is supposed to be zero, and that some applications actually need a true zero output. For example, if the output of the instrument is metered, and the flow is sometimes shut down, it is obviously desirable that the instrument actually produce its nominal zero output, if it remains connected to the metering equipment while no flow exists.

According to our invention, we provide a so-called "hard zero" by slightly modifying the calibration of the instrument. To begin, assuming the conventional case where the output pressure of servo relay SR at zero is supposed to be 3 p.s.i.g., screw 71 is operated, at zero flow, to depress spring 61 far enough that relay output is a little less than 3 p.s.i.g., say 2.8 p.s.i.g. We then provide a zeroing pin 155, which, like pin 55, is adjusted by means of a screw 175, threaded into beam 36 as is screw 75. Pin 155, however, is integrally-secured to screw 175, and has a collar 175a on its lower end, which collar underlies spring 65, but not spring 61 (see FIG. 4, where the collar 175a and pin 155 are illustrated in relation to springs 61 and 65).

Returning to the modification of the calibrating procedure, as thus far described, pin 175 is screwed up until it stresses spring 65 just enough to restore the instrument output to 3 p.s.i.g. (pointer 101, if indication be provided, is adjusted to indicate zero now, also). The calibration, from this point, proceeds as before insofar as springs 62 to 65, inclusive, are concerned.

In operation, beam 34 deflects counter-clockwise as the flow increases and, very shortly, collar 175a has moved down enough that spring 65 is back in its unstressed position. Spring 65 is not thereafter stressed, unless the flow increases enough that pin 55 begins to push down on the spring 65.

Since the use of pin 175 is to increase the effective stiffness of spring unit SS in the vicinity of zero flow, pin 175 is located well back from the other pins and toward the fixed end of whichever spring blade it is to effect.

Thus modified, the zero of the instrument will be as stable as desired, yet the expedient of the hard zero will not worsen the approximation to square root operation by more than a half a percent, and this only in the range nominally covered by spring blade 61 alone.

We wish it to be understood that the zero problem in question is not the fault of the instrument, but is simply a consequence of the fact that the desired input/output relation necessitates that the instrument be extremely sensitive at one end of its range and extremely insensitive at the other end thereof. Any real instrument, whatever its construction, would have the same problem, in one form or another, to a degree depending on the variability of sensitivity implied by the range of input and output it is designed for.

As was remarked supra, an indicator unit 100 is provided as one means of utilizing the motions of rod 34. Unit 100, suitably a tape-movement type of mechanism such as disclosed in the aforesaid copending application, receives the vertical motion of a clamp-block 103 on rod 34 and linearly translates this motion into an angular movement of pointer 101 on circular scale 102.

Servo-unit SR also includes a relay section, such as is more fully described in the aforesaid copending application. This relay section amounts to a pressure regulator of the force-balance type responsive to a force exerted via a calibrated spring to produce an output pressure linearly proportional to said force.

Thus, in FIGURE 2, partitions 104 and 105 in casing 30 define a pressure chamber 106. Pipe 107 connects pipe 20 and air supply A.S. to chamber 106 via a fitting 108 fixed to partition 105. A vent-tube 109, extending between pressure chamber 106 and the space between partition 104 and diaphragm 31, is loosely received in an aperture 110 in partition 104. Vent-tube 109 is supported by the closed end of a bellows 111, the open end of which surrounds aperture 110. A calibrated spring 112 is arranged in compression between diaphragm 31 and the upper end of bellows 111.

A valve member 113 is arranged in fitting 108 so as to control flow through said fitting and through vent-tube 109, the arrangement being that if bellows 111 is forced downward, the valve member 113 shuts off the vent-tube at its lower end and opens the fitting to permit flow into chamber 106 from air supply A.S. Conversely, if the bellows 111 is forced upwards, the valve member eventually closes off fitting 108 and the vent-tube clears the valve members 113. Many such supply and waste arrangements being known in the art, a more detailed description is unnecessary.

Spring 112 is supposed to be linear, hence, if some pressure measuring device (not shown) be connected to chamber 106, via a pressure connection 114 in partition 105, it will be found that the pressure indicated by said device will be linearly proportional to the position of rod 34. In other words, spring 112 measures the position of rod 34 and converts the measurement to a force tending to cause air to be admitted to chamber 106, whereas the pressure in chamber 106 exerts a counter force on bellows 111, tending to vent said chamber, each said force holding the other in balance. An orifice 115 in partition 105, providing a slight leak of air from chamber 106, assures that the supply and waste action of valve member 113 has no dead spot.

Thus, the structure from partition 104, down, of servo-relay SR, amounts to a pressure regulator capable of maintaining a pressure in a closed capacity such as the pressure responsive element of a pressure gauge, or the like. This pressure is in proportion to the force exerted by spring 112, hence, bellows 111, vent tube 109, valve member 113, etc., act as a movable control element of such regulator, in that change in said force moves the named structure and hence brings about a change in said pressure.

It will be evident from the foregoing that, since the position of rod 34 represents the square root of the force P, the scale 102 may be evenly divided, each division representing the same increment of the flow creating the force P. While the same result was attained in the species of FIGURE 1, the length of scale 102 will be many times the length of scale 8 for the same range of flow.

Assuming that the force P varies exactly as the differential pressure, it will be seen that as a practical matter, the accuracy of the result, i.e., vertical position of rod 34 is dependent solely on the characteristics of the spring unit SS. The force rebalance substantially prevents the diaphragm or other pressure responsive element creating the force P, from behaving non-linearly, and the ample reserve of power provided by the servo action of servo-unit SR allows friction coupled to the servo-rod 34 to be ignored.

The mechanics of the spring unit SS are based on several related considerations, one being that the servo-unit SR has a relatively large, powerful output motion which is desirable for its own sake, if only to operate indicator unit 100, FIGURE 2, including pointer 101 which indicates the position of servo-rod 34 with respect to scale 102.

Again, in deliberately designing non-linearity in a spring device, it is convenient to utilize one or several substantially linear springs, and make some provision for varying effective spring rate, at the same time the spring or springs is or are being subjected to some input motion to be converted into a force non-linearly related to the input motion. For example, one may provide a single cantilever spring and arrange a cam or a series of screw stops along the spring so that as the spring is deflected, it picks up more and more of the stops or of the cam surface. However, this invariably results in the free length of the spring being indefinite, or in difficulty in locating the zero of the cam surface, or in complication of the spring shape such as to introduce some unwanted non-linearity into the spring characteristic over and above the non-linearity desired. Furthermore, if the motion to be converted by the spring or springs is relatively large, the spring or springs must be relatively flexible, else they will exhibit considerable hysteresis, inherent non-linearity, etc.

Spring unit SS, however, provides a series of individual springs which are as simple as possible and chosen such as to remain well within their elastic limits as they are deflected by beam 36. The effective lengths of the springs, while not constant or even readily determinable as such, are repeatable, i.e., each successive time a spring is deflected (with a given setting of its associated pin) variation in effective length remains exactly the same, since there is no indefiniteness about exactly where on the spring its pin applies the deflecting force, whereas the clamped end of the spring keeps the fixed termination of the effective length of the spring in the same place at all times.

In the nature of things, it is desirable that parallelism and perpendicularity variously reign, in general, among the lever arms of the mechanism of FIGURE 2, with respect to the direction of motion of rod 34. Since such condition can only exist at one value of the force P, the condition is chosen at the mid-range of the motion output of the instrument seen at rod 34. In this way the effect of beam-motion angularity is distributed over the range of the instrument. For example, an adjustment of this sort is provided by stud 79 and collar 82, screwing of collar 82 up and down being used to aid in positioning beam 36 at right angles to rod 34 at the midpoint of rod travel.

The adjustments provided for by the stepped blocks 89 and 90 relate to the fact that the actual range of servo output motion varies from unit to unit, on account of manufacturing tolerances, hence, it is necessary to modify the compensating effect of bimetallic plates 86 accordingly.

The reason for providing a fulcrum between 37 and 38 in the form of nut 43 threadable up and down beam 38 is to provide for adjustment of the range or span of the instrument. The range or span of the instrument, in terms of the change in force P required to produce full scale change in the the output of servo-unit SR, is the larger, the shorter the effective length of beam 37 between fulcrum 40 and fulcrum nut 43. Conversely, if the nut 43 is next the lowermost point of beam 37, only relatively small change in force P is necessary to drive pointer 102, or the pressure output at connection 114 from minimum to maximum, or vice versa.

It is evident that deflections of beams 37 and 38 will cause the contacting surfaces of beam 37 and nut 43 to slide relative to one aonther. While rounding the edge of the nut and polishing the adjacent surface of the beam will minimize friction, on the other hand, according to our invention, friction error at this point may be eliminated by providing a nut with a flexible edge, as shown in FIGURE 12, which illustrates a fulcrum nut 43A, which may be basically like nut 43, except in having a circular, washer-like flange 43B made out of sheet, spring material, such as stainless steel, 0.008 in. thick, for example, the net width of the flange being just enough that it will not buckle, yet will flex slightly, transversely of itself, i.e., cantilever fashion. The advantage of this is that, as the beams 37 and 38 change their relative positions slightly during operation of the instrument, the friction of the relatively sharp-edged flange 43B will keep it from sliding along the surface of lever 37 while at the same time the flange both flexes slightly yet, like a substantially rigid member, transmits force between beams 37 and 38, without buckling. More accurately, with respect to forces exerted against its edge and in its plane, flange 43B is substantially rigid. Thus, "flexing" is the only "buckling" it undergoes, and the flexing is substantially restricted to the extent needed to accommodate the very slight changes in angle between beams 37 and 38.

The flexible fulcrum provided by nut 43A obviates the manufacturing expense of polishing the surface of beam 38, and the further expense of maintaining a polish thereon in service, as well as eliminating an appreciable source of friction that polishing will not eliminate.

Figure 13:
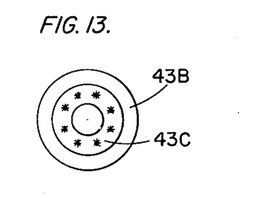

Flange 43B is conveniently welded to one end face of nut 43A and provided with a circular stiffening washer 43C, welded to the flange, the dimensions of washer 43C being chosen so as to leave free a peripheral section of the flange that is just wide enough to permit limited flexing, as described supra. Washer, flange and nut are concentrically secured together, of course, the welds between washer and flange being indicated by small crosses in FIGURE 13.

Screw 23 is provided for the purpose of adjusting baffle-nozzle spacing to the correct value for a given value of P, corresponding to, say zero p.s.i. Spring 44 is provided for the purpose of balancing the forces on beam 10 in order to maintain the correct relation between torque developed by the servo system and the torque developed by the force P.

In order to provide for arranging beams 37 and 38 in parallel, the rod 11, which is sufficiently flexible to accommodate the angularity of the motions of beams 10 and 38, may pass through beam 10, as shown, and be secured thereto by means of a set screw 121, or the like, which may be loosened so as to permit adjusting the angle between beams 37 and 38, as desired, and then tightened so that the desired state of adjustment is retained, from the point of view of beam 10.

It is also desirable to provide suitable means for adjusting the deflection of pointer 100 with respect to vertical movement of rod 34. Various such means are known, e.g., that disclosed in the aforesaid copending application, and we do not deem it necessary to describe such here.

In the foregoing, we have used the term "motion" to refer to quantitative change in position. While it is customary in the art to indulge in this practice, we wish to point out that the term, as will be clear from the context, is used in the static sense of how much motion, not in any dynamic sense having to do with rate of movement. This is inherent in the force balance principle, whether force is fed back, as in FIGURE 2, or merely absorbed without feedback, as in FIGURE 1. In other words, we are not directly concerned with the transient aspects of mechanism function. However, in the claims infra, we have freely used both the "motion" terminology, and as well, the language of change in position, since in some cases the latter is more convenient for claim purposes than the former.

Having fully described the construction and use of the best form of our invention known to us thus far, we claim:

1. In a measuring instrument of the force balance type, having an output, and including a pair of beams, each of said beams being mounted for deflection toward and away from each other;
   (a) there being means exerting a first deflecting force on one of said beams, said first deflecting force being representative of a variable condition;
   (b) and there being means exerting a second deflecting force on the other of said beams, said second deflecting force being representative of said output;
   (c) the beams being arranged to transmit said forces each to the other in such proportion as to substantially prevent net deflection of said beams, by means of a fulcrum secured to one of said beams and bearing on the other of said beams;
   (d) the improvement comprising a fulcrum having a relatively sharp edge in contact with said other of said beams, said sharp edge being connected to the remainder of said fulcrum by a flat, transversely, elastically, flexible portion that is substantially rigid with respect to forces exerted against said edge and substantially in the plane of said portion, is integral with said fulcrum and said edge, and is normal to the surface of said other beam at the point of contact of said edge with said other beam, said portion being sufficiently flexible that if said beams deflect in response to force exerted by one thereof, via said fulcrum, on the other thereof, said portion will flex elastically enough to maintain contact of said edge with said other beam at substantially the same point as before such deflection.

2. The invention of claim 1, wherein said fulcrum is in the form of a washer-like element of spring material.

3. The invention of claim 1, wherein said instrument includes
   (e) means responsive to said condition to produce motion that is relatively large with respect to changes in said condition;
   (f) and spring means constructed and arranged to convert said motion into a relatively small change in force in response to a given change in said condition when said condition is at one extreme of its expected range, but to convert said motion into a relatively large change in force in response to said given change when said condition is at the other extreme of its expected range, said spring means being arranged to apply its said force as said second deflecting force on said other of said beams.

4. An instrument comprising, in combination,
   (a) a primary element mounted for movement in response to a force;
   (b) a motion element mounted for movement in response to a motion;
   (c) a spring unit connected to said motion element for converting said movement thereof into a force that is a non-linear function of said motion;
   (d) means for transmitting the last said force to said primary element and applying it to said primary element to move said primary element in a sense opposite to the first said movement thereof;
   (e) servo means responsive to the said first said movement to create said motion, whereby to move said motion element and create the second said force;
   (f) said spring unit being arranged to exert said last said force on said primary element when the first said force is zero, and there being provided spring means arranged to exert a balancing force on said primary element balancing said last said force when said first said force is zero, said spring means being responsive to attainment of a small, non-zero value by said first said force to cease exerting a said balancing force on said primary element.

5. An instrument comprising, in combination,
 (a) a primary element mounted for movement in response to a force;
 (b) a motion element mounted for movement in response to a motion;
 (c) a spring unit including a plurality of springs, each located in the path of movement of said motion element, said springs being spaced along the said path at such distances that deflection of said motion element along said path brings said motion element into contact with one of said springs before another of said springs, each of said springs being positioned to contact said motion element solely via its own contact means, there being provided a plurality of such contact means, each being spaced, one from the other, in a direction transverse to the said path of movement;
 (d) a force transmitting member connected between said springs and said primary element and furnishing a reaction member supporting said springs for elastic deformation thereof in opposition to said force and in response to deflection of said motion element in said path;
 (e) servo means responsive to the said first said movement to create said motion, whereby to move said motion element and create a second force opposing the first said force.

6. A force balance measuring instrument, said instrument including, in combination,
 (a) a first member responsive to a variable condition to move in response to change in said condition, movement of said first member having a sense corresponding to the sense of said change;
 (b) servo means having a second member, said servo means being responsive to said movement of said first member to cause movement of said second member, corresponding in sense to the sense of said movement of said first member;
 (c) feedback means for converting said movement of said second member into force having a sense corresponding to the sense of said movement of said second member, said feedback means being arranged to apply said force to said first member in a sense opposing said movement of said first member;
 (d) said feedback means including a spring blade, force transmitting means interconnecting one end of said spring blade to one of said first members and said second member, and a lost motion connection between the other end of said spring blade and the other of said first member and said second member, said blade being arranged to transmit motion by cantilever action between said first member and said second member, but for lost motion in said lost motion connection;
 (e) there being a plurality of spring blades, each having a lost motion connection providing an amount of lost motion that is different from that provided by any of its fellows.

7. The instrument of claim 6, wherein,
 (f) one of said spring blades is provided with two lost motion connections, each thereof being arranged to provide its lost motion when the other thereof is transmitting motion between the last said one of said spring blades and said other of said first member and said second member;
 (g) each of said two lost motion connections being arranged to transmit motion in a directional sense opposite to that in which the other thereof transmits motion.

8. A force balance measuring instrument, said instrument including, in combination,
 (a) a first member responsive to a variable condition to move in response to change in said condition, movement of said first member having the sense of said change;
 (b) servo means having a second member, said servo means being responsive to said movement of said first member to cause movement of said second member in the same sense as said movement of said first member;
 (c) feedback means for converting said movement of said second member into force, said feedback means being arranged to apply said force to said first member in a sense such as to reverse said movement of said first member;
 (d) said feedback means including a plurality of springs each interconnecting said first member and said second member;
 (e) and at least certain of said springs each having lost motion connections to one of said members, the connections of said springs to said members otherwise being such that said movement of said first member is elastically applied through the said springs to said second member, and each of said lost motion connections allowing an amount of lost motion to said first member that is different from the amount of lost motion allowed by certain of its fellows.

9. A measuring instrument comprising, in combination,
 (a) a plurality of cantilever-mounted blade springs, said springs being located side by side and having their fixed ends adjacent one another and their free ends adjacent one another;
 (b) rigid means movable toward and away from the free ends of said springs;
 (c) means rigidly-supporting the said fixed ends of the said springs;
 (d) contact elements mounted for movement by said rigid means;
 (e) each of said elements having a contact portion located between said rigid means and one of said springs, said contact portion being so positioned that motion of said rigid means toward and away from said springs will move said contact portion into and out of contact with the free end of said one of said springs, and
 (f) said contact portions being arranged side by side to match the side by side arrangement of said springs, whereby motion as aforesaid of said rigid means will be converted by said force-exerting means into a force which is a function of the extent of motion, number of springs engaged at any one time of the said contact portions, and the elastic properties of said springs.

10. The invention of claim 9, including
 (g) a motor, said motor being responsive to a relatively minute motion to create a relatively large motion, said rigid means being responsive to said relatively large motion, to move toward and away from the said free ends of said springs until the force created by said relatively large motion is balanced by the force exerted on said rigid means by said springs.

11. The invention of claim 9, including
 (g) a member movable to positions representative of the difference between two fluid pressures, said rigid means being arranged to move toward and away from said free ends in linear proportion to change in position of said member;
 (h) said spring having linear spring constants and the contact elements having their contact portions positioned at varying distances from the free ends of the said springs, the arrangement being that as the aforesaid difference increases in a given sense, more and more springs are engaged by their corresponding contact portions;

(i) whereby decreasing elements of position change of said member each creates the same increment of force in said springs as said difference in two fluid pressure increases, the result being that the position of said rigid means will linearly represent the square root of the said difference.

12. The invention of claim 9, including
  (g) a further contact element mounted for movement by said first rigid means;
  (h) said further contact element having a contact portion located on the other side of said rigid means from said springs, the last said contact portion being in contact with one of said springs, but on the other side thereof with respect to the other contact portions of the former said contact elements, said last contact portion being arranged to move out of engagement with the last said one of said springs, if said rigid means moves toward said springs.

13. A spring unit for converting motion into force; said spring unit comprising:
  (a) a plurality of spring blades, a plurality of contact members, a movable member and a rigid member;
  (b) each said blade being fixed at one end thereof to said rigid member, and extending therefrom;
  (c) said contact member being positioned so that each thereof is positioned adjacent one of said blades at the side thereof and adjacent the free end thereof, the arrangement being that each of said blades has a different one of said contact members thus associated therewith;
  (d) said contact members being secured between said blades and said movable member for transmitting motion of said movable member to the free ends of said blades;
  (e) each of said contact members having a pair of opposed end portions, one of said pair being in contact with one of said movable members and that one of said spring blades that is associated with the last-mentioned contact member; and
  (f) certain of the remaining ones of the pairs of the said opposed contact portions also being in contact with corresponding ones of said movable members and the spring blades associated therewith; and the balance of said remaining ones of said pairs of the said opposed portions being spaced at varying distances from one of said movable member and the other spring blades.

14. The invention claim 13, wherein said contact members are in the form of elongated pins each having as one of its end portions a section of reduced breadth as compared to the other of its end portions, and each one of the said blades having an aperture therein of sufficient dimension to pass said one of said end portions in its entirety but insufficient to pass the remainder of said pin.

15. The invention of claim 13, wherein said blades and said movable members have sockets therein facing each other and aligned with the said pins, there being at least as many pairs of sockets as pins, and each of said pins having a pair of sockets aligned therewith.

16. The invention of claim 13, wherein all save one of said blades are constructed and arranged to elastically resist bending thereof by motion of said contact members thereagainst at the same rate, said one of said blades being arranged to elastically resist such motion at about half said rate.

17. The spring unit of claim 13, including a further contact member contacting one of said spring blades on the other side thereof from the former said contact members, and arranged to disengage from the last said one of said spring blades as the corresponding one of said former said contact members approaches said last said one of said spring blades.

18. The invention of claim 13, wherein said blades are in the form of a comb, said comb consisting of a rectangular sheet of spring material having one side thereof bent up at an angle to the remainder thereof, said sheet having slots extending from points near said one side, but spaced therefrom and passing through said sheet to and through the side thereof opposite the said one side, said slots extending along said each other but not intersecting within the confines of said sheet.

19. The invention of claim 18, wherein said slots are parallel and of constant width, all but one of said slots being the same, said one of said slots being sufficiently wide that a width of said sheet adjacent the last said slot is substantially less than any other width of said sheet between slots, said slots and said sheet being dimensioned so that all other widths of sheet between slots are identical.

20. A flowmeter, comprising, in combination,
  (a) a first member deflectible in response to the pressure drop across a restriction in a fluid flow line;
  (b) a baffle and a nozzle, one thereof being responsive to deflection of said first member to move with respect to the other thereof, the arrangement being that a relatively minute amount of such motion creates a change in back pressure in said nozzle;
  (c) a servomotor having a second member, said servomotor being responsive to said change in back pressure to cause said second member to execute a relatively large, high-energy motion corresponding in sense to said change;
  (d) a plurality of springs arranged to receive the last said motion, said springs being interconnected between said members, one portion of each of said springs being connected to one of said members, each said spring having a second portion thereof connected to the other of said members;
  (e) said first and second members, said baffle and nozzle and said servomotor being arranged so that motion of said second member as a result of a deflection of said first member is transmitted through said springs to said first member in opposition to said deflection;
  (f) each of the connections of certain of said springs to one of said members having lost motion therein, there being means connecting the last said springs to the other of said members without lost motion, the amounts of lost motion in the first said connections varying from spring to spring in such proportions that as the pressure drop in said flow line increases, the force exerted by said springs on said second movable member, varies as the square of the motion of said first member, said first said connections being spaced, one from another, transverse to the path of movement of said second movable member.

21. The invention of claim 20, wherein said certain of said springs are cantilever springs, and including
  (a) a force-transmitting means to which each of said cantilever springs has an end fixed;
  (b) a beam connected to said second member for deflection thereby toward said free ends;
  (c) contact pins arranged adjacent the free end of said cantilever springs;
  (d) said pins being positioned between the said free ends and said beam, there being one pin per free end arranged in contact with one of the last said free end and said beam, and said one pin being spaced from the other of said last said free end, and said beam, the spacings thus created, as between said one pin and one of said last said free end and said beam, corresponding to the said lost motion;
  (e) said force-transmitting means being connected to said first member for transmission of the force created in said springs, by beam deflection, to said first member.

22. The invention of claim 20, wherein said second member is effectively comprised by a temperature compensated linkage, said linkage comprising:
   (a) a first movable member, a second movable member and a motion-transmitting means interconnecting said members for transmitting motion of one of said members to the other thereof; said motion-transmitting means comprising:
   (b) an elongated element of the type responsive to change its lengthwise curvature in proportion to its temperature, connecting means fixing one end of said elongated elements to said first movable member and connecting means fixing the other end of said elongated element to said second movable member, one of said connecting means including:
   (c) a pair of clamp members having an end of said element clasped therebetween, the whole being fixed to the movable member to which said one of said connecting means fixes an end of said elongated element;
   (d) each of said clamp members being a block having at least a pair of unlike faces and having aligning means, said aligning means cooperating to align each block with the other when said clamp members are fixed to the last said movable member, said aligning means being constructed and arranged to align said blocks when either of said pair of unlike faces of one said block is juxtaposed to either of said faces of the other said block.

23. Temperature-compensated linkage, said linkage comprising
   (a) a first movable member, a second movable member and a motion-transmitting means interconnecting said members for transmitting motion of one of said members to the other thereof; said motion-transmitting means comprising:
   (b) an elongated element of the type responsive to change its lengthwise curvature in proportion to its temperature, connecting means fixing one end of said elongated elements to said first movable member and connecting means fixing the other end of said elongated element to said second movable member, one of said connecting means including:
   (c) a pair of clamp members having an end of said element clasped therebetween, the whole being fixed to the movable member to which said one of said connecting means fixes an end of said elongated element;
   (d) each of said clamp members being a block having at least a pair of unlike faces and having aligning means, said aligning means cooperating to align each block with the other when said clamp members are fixed to the last said movable member, said aligning means being constructed and arranged to align said blocks when either of said pair of unlike faces of one said block is juxtaposed to either of said faces of the other said block.

24. Temperature-compensated linkage, said linkage comprising
   (a) a first movable member, a second movable member and a motion-transmitting means interconnecting said members for transmitting motion of one of said members to the other thereof; said motion-transmitting means comprising:
   (b) an elongated element of the type responsive to change its lengthwise curvature in proportion to its temperature connecting means fixing one end of said elongated elements to said first movable member and connecting means fixing the other end of said elongated element to said second movable member, one of said connecting means including:
   (c) a pair of clamp members having an end of said element clasped therebetween, the whole being fixed to the movable member to which said one of said connecting means fixes an end of said elongated element;
   (d) each of said clamp members being a parallelepipedal block having one edge thereof cut away, and having a straight hole therethrough between opposing unlike faces of said block; a straight member received in said holes aligning said blocks, and means securing said blocks in aligned condition to the said last said movable member.

25. Temperature-compensated linkage, said linkage comprising
   (a) a first movable member, a second movable member and a motion-transmitting means interconnecting said members for transmitting motion of one of said members to the other thereof; said motion-transmitting means comprising:
   (b) an elongated element of the type responsive to change its lengthwise curvature in proportion to its temperature, connecting means fixing one end of said elongated elements to said first movable member and connecting means fixing the other end of said elongated element to said second movable member, one of said connecting means including:
   (c) a pair of clamp members having an end of said element clasped therebetween, the whole being fixed to the movable member to which said one of said connecting means fixes an end of said elongated element;
   (d) the other said connecting means including an adjustable member projecting from said elongated element and between the last said movable member and said elongated element, the said elongated member being sufficiently close to the said last said movable member that the dimensions of said adjustable member would cause said adjustable member to contact said last said movable member; and
   (e) said last said movable member having a through hole therein of more than sufficient size to receive said adjustable member, said through hole being located so as to surround said adjustable member and opening through said last said movable member on the other side of the latter from said adjustable member.

26. In combination,
   (a) a pressure regulator of the type having a first control element such that if force, in a given direction, is applied to said control element, said regulator is responisive to said force to produce a fluid pressure in a closed capacity such that the magnitude of said pressure is a function of the magnitude of said force;
   (b) a first motor means, said motor having a movable part and being responsive to fluid pressure applied thereto to create a long-stroke motion of said part along a given path in proportion to the magnitude of the last said fluid pressure;
   (c) a second control element, said second control element being operable to control the magnitude of the said last said fluid pressure;
   (d) a spring means connected to said first control element for applying force thereto in said given direction, said spring means being connected to said movable part and being responsive to movement thereof, along said given path, to convert said movement into said force in said given direction and apply said force to said first control element, as a function of the position of said movable part in said given path;
   (e) a third control element mounted adjacent said second control element for movement toward and away from said second control element;
   (f) second motor means for moving said third control element toward and away from said second control element;
   (g) linkage means interconnecting said part and said third control element, said linkage means including spring means constructed and arranged for converting motions of said part into force exerted in a direction such as to move said third control element toward and away from said part;

(h) the arrangement being that if said second motor means moves said third control element toward said second control element, the magnitude of said fluid pressure changes in such sense as to cause said part to move along said given path such that the motion of said part is converted by said spring means into a force opposing motion of said third control element toward said second control element, and vice versa, if said second motor means moves said third control element away from said second control element.

27. The invention of claim 26, the last said spring means being constructed and arranged to exert its said force in non-linear proportion to the extent of motion of said part.

28. The invention of claim 26, the last said spring means including a plurality of springs, each of said springs being connected between said first control element and said movable part, there being lost motion in the connection of each spring to one of said first control element and said movable part, at least some of such connections having lost motion in differing amounts.

References Cited by the Examiner
UNITED STATES PATENTS

| | | | |
|---|---|---|---|
| 2,107,976 | 2/38 | Blasig | 73—205 |
| 2,127,521 | 8/38 | Kemp | 267—1 |
| 2,816,562 | 12/57 | Dyson | 267—1 |
| 2,887,881 | 5/59 | Jones | 73—388 |
| 3,006,190 | 10/61 | Jansson | 73—205 |

FOREIGN PATENTS 147,715   5/51   Australia.

RICHARD C. QUEISSER, *Primary Examiner*.

ROBERT L. EVANS, *Examiner*.